June 5, 1923.

T. H. GAMMON

SPRING TIRE

Filed Sept. 22, 1921

INVENTOR.
Tillman H. Gammon
BY Hazard & Miller
ATTORNEY.

Patented June 5, 1923.

1,458,117

UNITED STATES PATENT OFFICE.

TILLMAN H. GAMMON, OF LOS ANGELES, CALIFORNIA.

SPRING TIRE.

Application filed September 22, 1921. Serial No. 502,320.

*To all whom it may concern:*

Be it known that I, TILLMAN H. GAMMON, a citizen of the United States, residing at Los Angeles, in the county of Los Angeles and State of California, have invented new and useful Improvements in Spring-Tires, of which the following is a specification.

This invention relates generally to a wheel construction for automobiles or similar vehicles and more particularly to a spring tire that can be readily applied to any standard wheel without altering or changing the construction of the same and the general objects are to provide a spring tire that is relatively simple, of substantial construction, inexpensive to produce and that may be readily applied to the standard wheels that are generally used upon vehicles and to further provide a construction that will protect the yielding parts from all foreign matter so that the life of the tire will be materially increased.

With the foregoing and other objects in view, the invention consists in certain novel features of construction and arrangement of parts that will be hereinafter more fully described and claimed and illustrated in the accompanying drawings in which:

Figure 1:
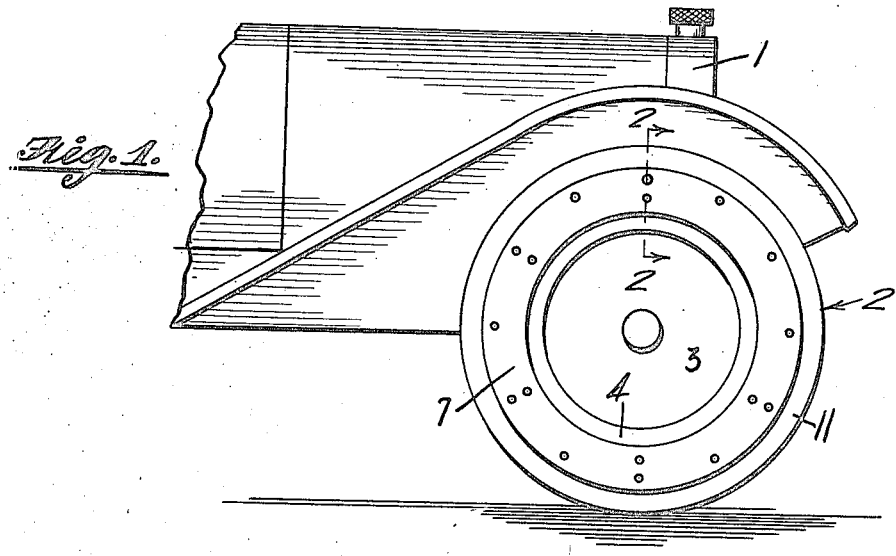
Fig. 1 is a fragmentary side elevation of a vehicle embodying my improved wheel construction.

To illustrate a practical embodiment of my invention, a vehicle 1 is shown having a wheel provided with my improved tire construction mounted thereon which wheel as illustrated in the drawings, comprises a disk 3 supported upon any usual hub construction and it will be understood that any suitable type of wheel having a felly 4 could be used besides the disk construction type.

Mounted upon the periphery of the felly 4 is a thin metallic band 5 upon which is mounted a rim 6 slightly less in width than that of the band 5 so that annuli 7 may be fastened upon the sides of the rim 6 as by bolts 8 and the outer sides of which will be flush with the sides of the band and felly. The rim 6 may be shrunk upon the band or secured in any suitable way.

Figures 2, 3:
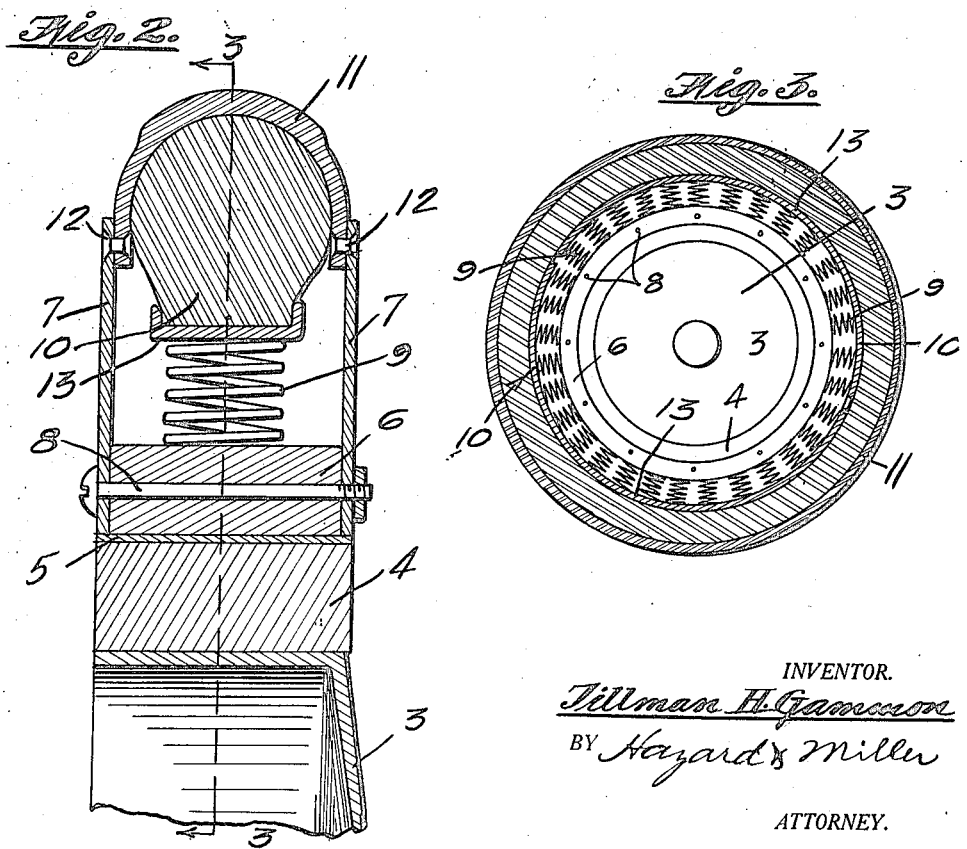
Fig. 2 is a fragmentary transverse section taken on line 2—2 of Fig. 1.
Fig. 3 is a vertical longitudinal section taken on line 3—3 of Fig. 2.

Positioned around the rim 6 are radially extending compressible springs 9 suitably spaced so that proper resiliency in the tire may be had. A heavy channel iron ring 13 fits upon the springs 9 and holds the springs under a certain amount of compression. This ring 13 is made up of two semi-circular sections as clearly shown in Figure 3. A solid rubber tire core 10 fits in the channel ring 13. A tire casing 11 fits the solid rubber tire core 10 and the edges of the tire casing 11 are secured to the outer edges of the annuli 7—7 as by rivets 12.

Various changes may be made in the details of construction by those skilled in the art without departing from the spirit of my invention as set forth in the appended claim.

What is claimed is:

A spring tire comprising an annular series of circumferentially spaced compression springs adapted for positioning upon the rim of a wheel, a ring formed of two semi-circular sections surrounding and engaging said springs, a tire core surrounding and supported on said ring, a tire casing embracing the core, and means for securing the tire casing to said rim and in embracing position with respect to the core.

In testimony whereof I have signed my name to this specification.

TILLMAN H. GAMMON.